Figure 1:
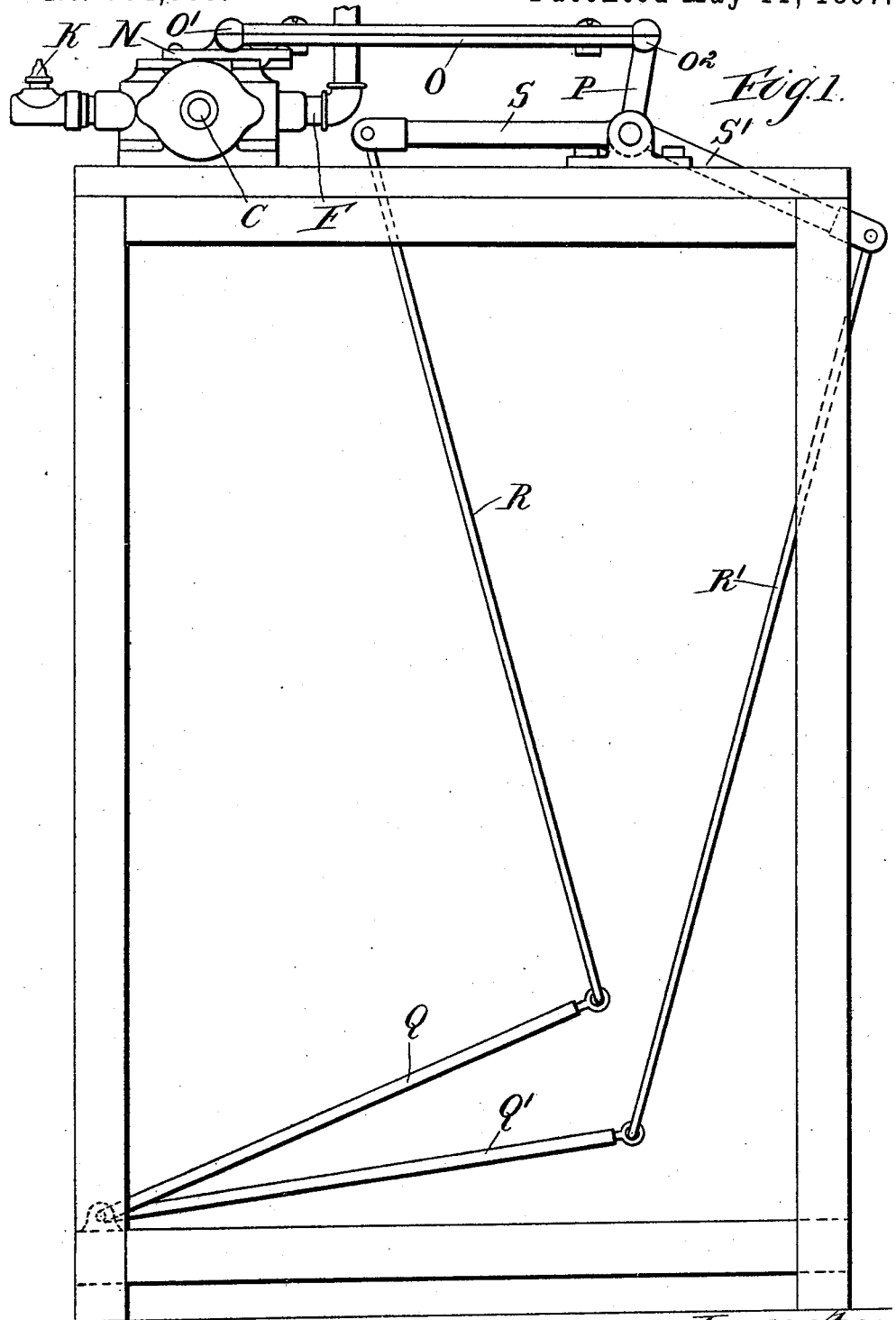

(No Model.) 5 Sheets—Sheet 3.

J. E. PARKER.
MEASURING AND FILLING APPARATUS.

No. 582,369. Patented May 11, 1897.

Witnesses:
A. F. Durand.
A. M. Belfield

Inventor:
John E. Parker.
By Chas. G. Page. Atty.

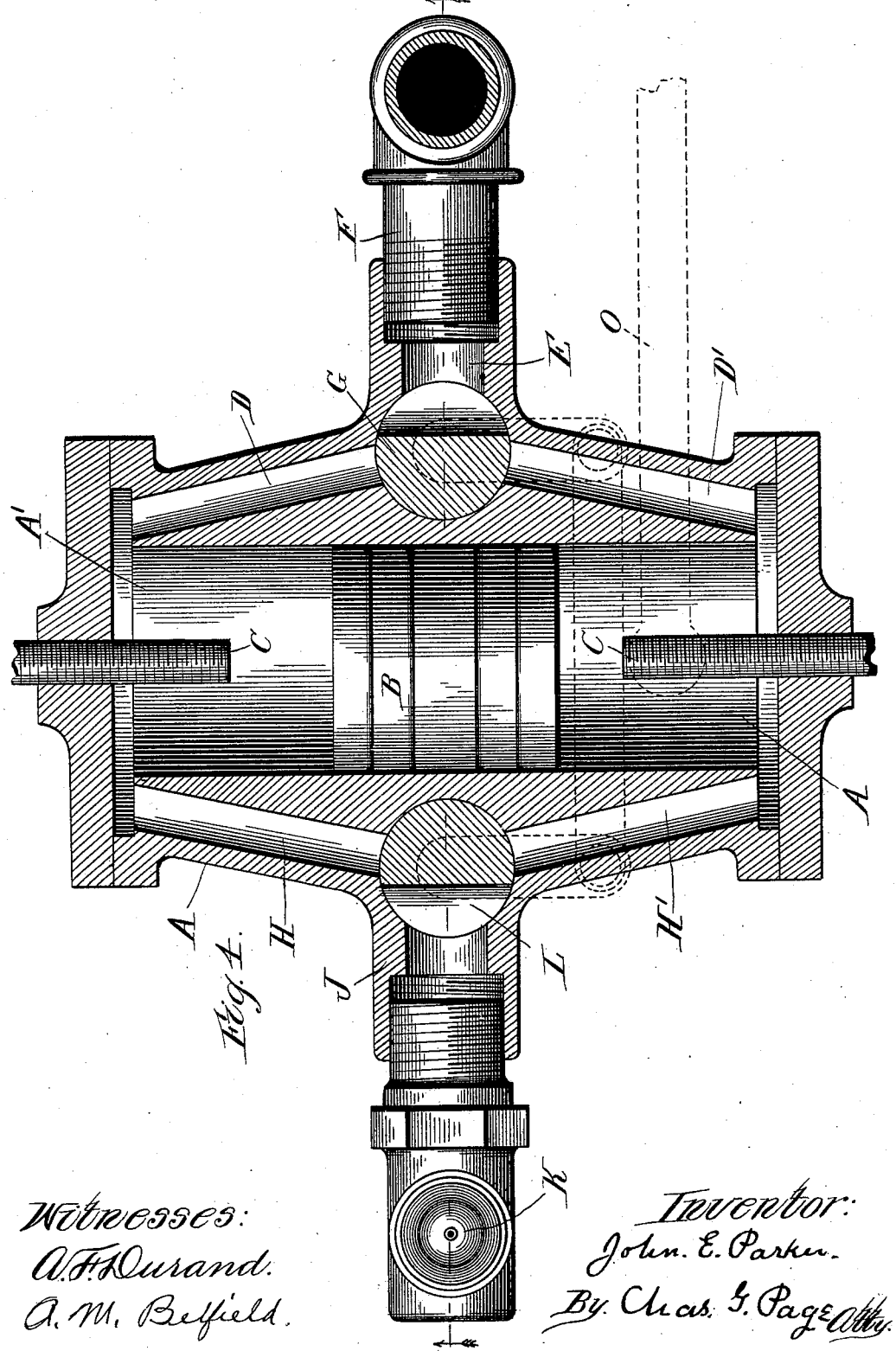

(No Model.) 5 Sheets—Sheet 5.
J. E. PARKER.
MEASURING AND FILLING APPARATUS.
No. 582,369. Patented May 11, 1897.
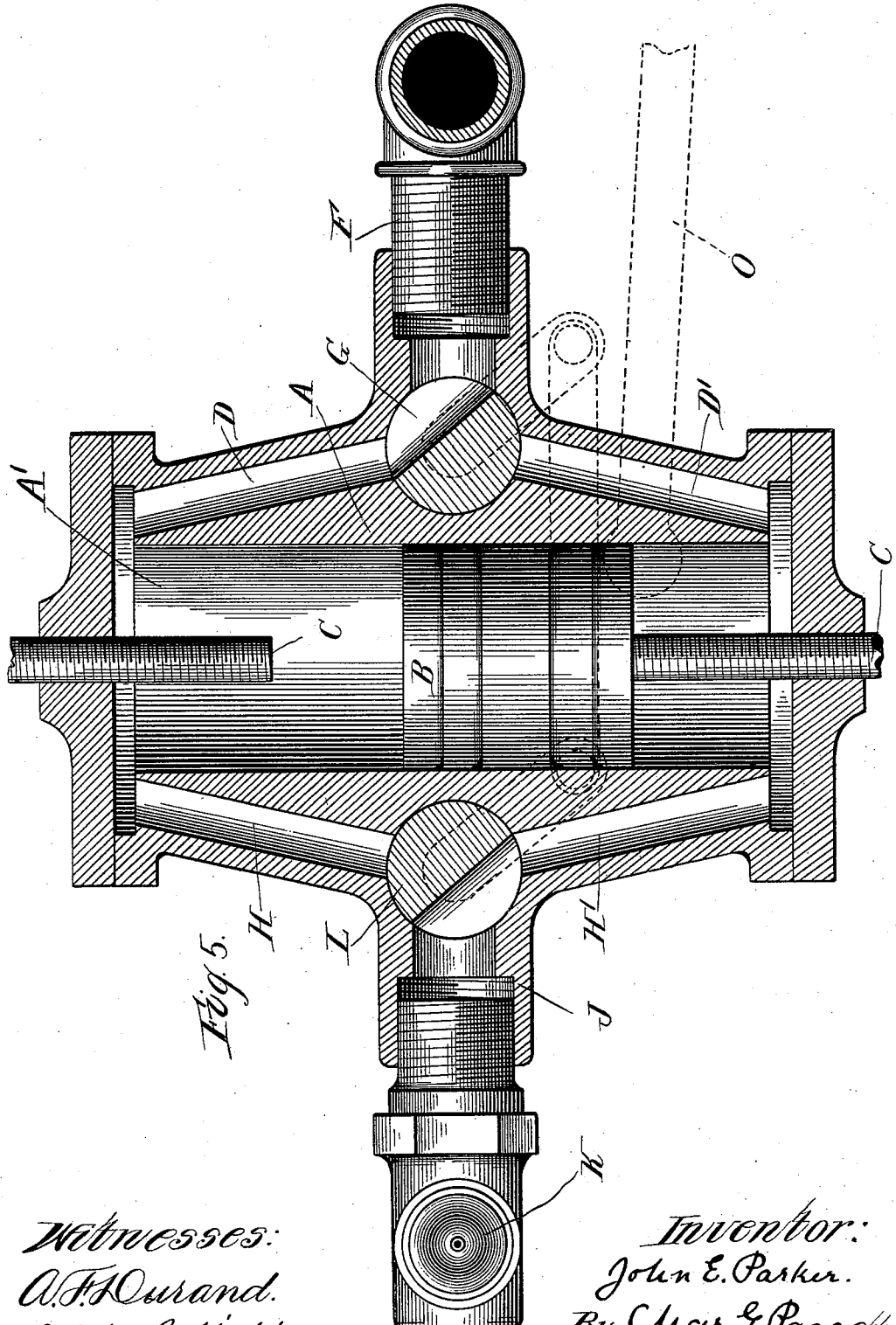
Witnesses:
A. F. Durand.
A. M. Belfield
Inventor:
John E. Parker.
By Chas. G. Page Atty.

UNITED STATES PATENT OFFICE.

JOHN E. PARKER, OF CHICAGO, ILLINOIS, ASSIGNOR, BY MESNE ASSIGNMENTS, TO THE MORGAN & WRIGHT, OF SAME PLACE.

MEASURING AND FILLING APPARATUS.

SPECIFICATION forming part of Letters Patent No. 582,369, dated May 11, 1897.

Application filed February 20, 1896. Serial No. 580,057. (No model.)

*To all whom it may concern:*

Be it known that I, JOHN E. PARKER, a citizen of the United States, residing in Chicago, county of Cook, and State of Illinois, have invented certain new and useful Improvements in Measuring and Filling Apparatus, of which the following is a specification.

The common custom of supplying various commercial commodities to the public in bottles, cans, flasks, or similar receptacles has caused a demand for an apparatus which is capable of filling such receptacles preparatory to shipment or sale by first measuring off a suitable quantity of the commodity in question, which is herein termed "filler," because such receptacles are to be filled with it, and, second, injecting the charge thus measured into a receptacle placed in position to receive the same.

To an apparatus of this class my invention relates particularly, although its adaptability for use simply as a metering device will be evident to those skilled in the art.

Prominent objects of my invention are to produce a simple and efficient apparatus which will accurately measure out successive charges, all of a predetermined size or quantity, to permit the size of charge to be varied to accommodate receptacles of different sizes, to arrange for the convenient injection of these charges into the receptacles unaccompanied by waste or refuse, to reduce the labor and attention necessary for the operation of such an apparatus to a minimum, and to enable a record to be kept of the number of charges ejected and consequently of the amount of filler consumed.

In carrying out my invention the filler is supplied to the apparatus under pressure and a quantity sufficient for a charge is allowed to flow into it. The flow of filler is then directed and received in the apparatus in such a manner that the contained charge is ejected therefrom by the incoming filler, a like amount of which for another charge enters in so doing. This second charge is then ejected by the entrance of the third, and so on. By such arrangement the pressure under which the filler is supplied is instrumental in causing the ejection of each charge, it being necessary only to properly direct the flow of filler and to place the receptacles in position to receive a charge and to remove the same when filled.

To this end my invention consists in providing a chamber adapted to serve as a measure and arranging within the same a diaphragm which is capable of movement from end to end thereof; in providing means for limiting the stroke of said diaphragm; in providing parts and valves, so that the filler may be supplied to the chamber near either end and also so that the same may be ejected from the end opposite for the time being to the supply end; in arranging a registering device so that the number of charges ejected is recorded, and in such other features as are hereinafter set forth.

Figure 2:
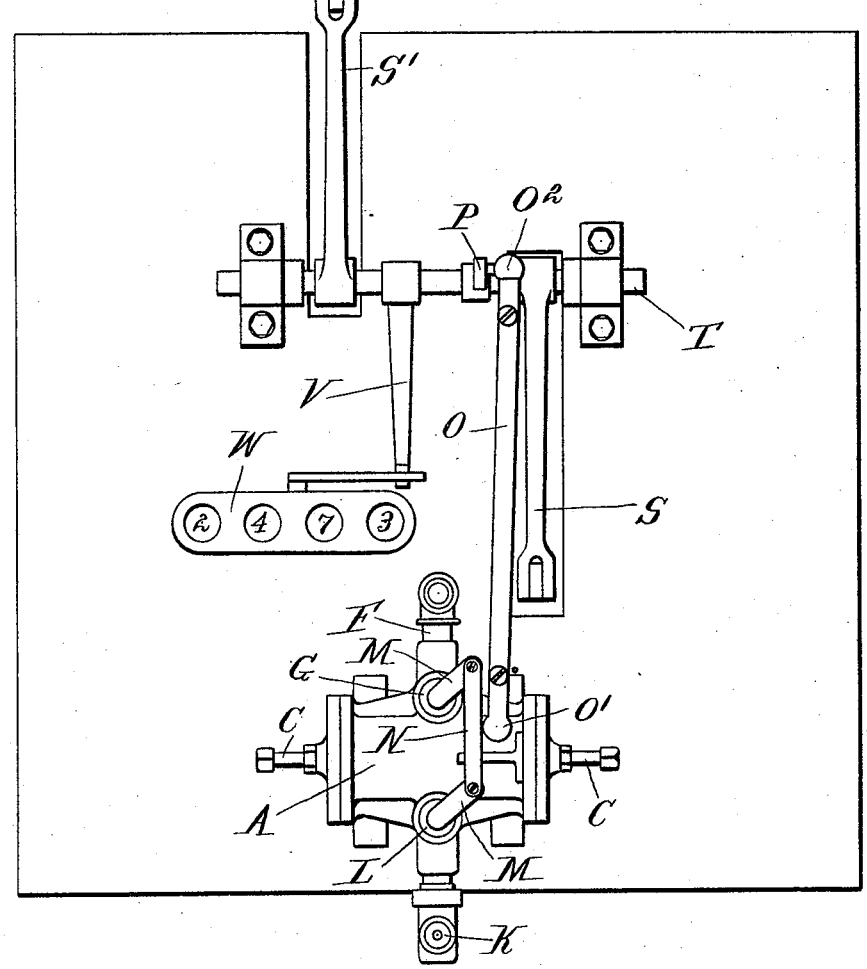
Figure 3:
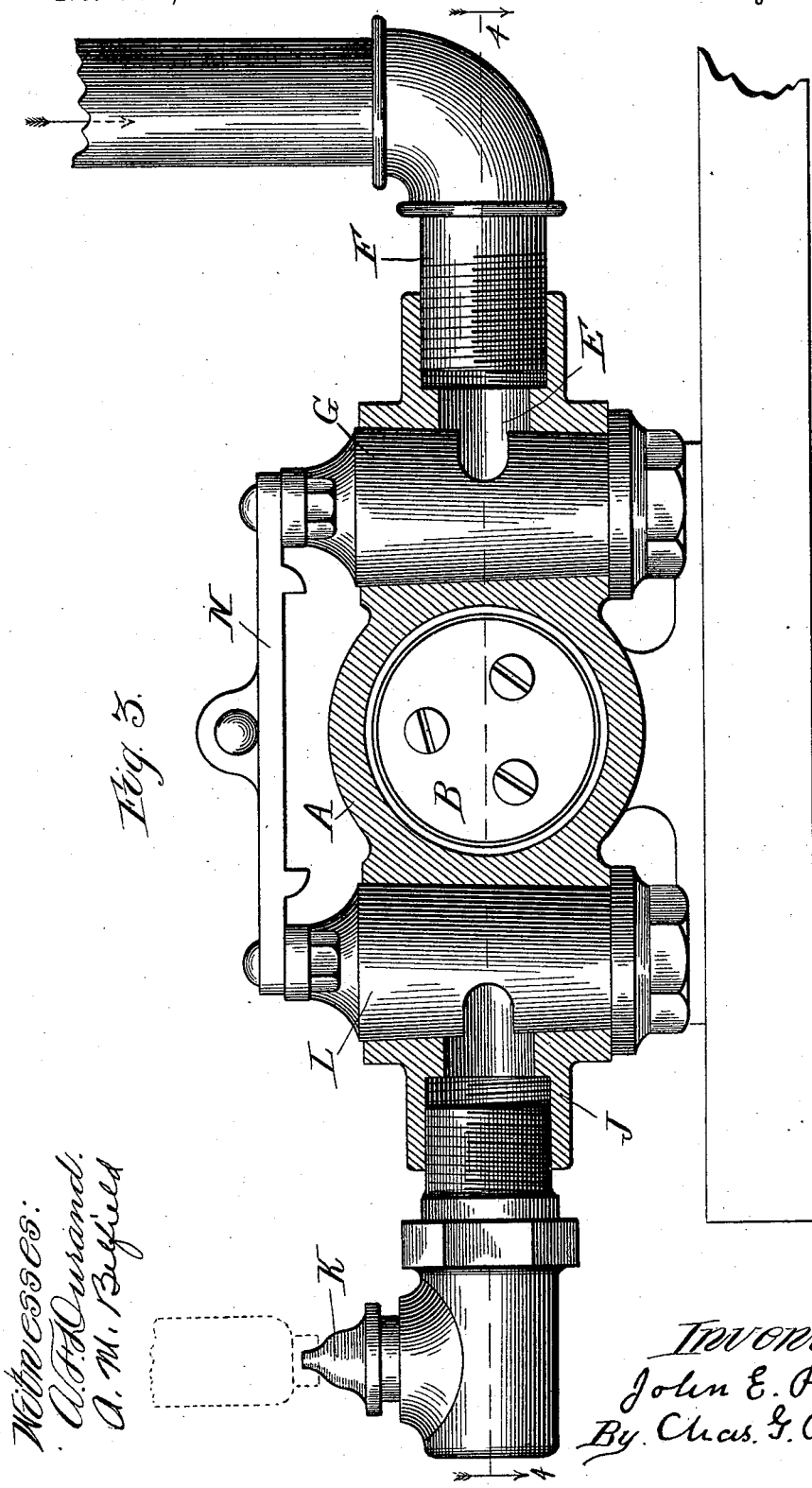

Figure 1 is an elevation of an apparatus embodying my invention mounted for convenience upon a suitable support. Fig. 2 is a top plan of the same. Fig. 3 is a central vertical section of the measuring portion of said apparatus. Fig. 4 is a horizontal section at the line 4 4 in Fig. 3. Fig. 5 is a section similar to Fig. 4, showing the parts in different position.

As a simple and convenient arrangement I construct the receiving-chamber in the form of a cylinder, as A, and arrange within it the piston-head B, which is desirably of sufficient length to assure its retention in an upright position. This piston-head is free to move from end to end of the cylinder when pressure is exerted on either side thereof. The cylinder may be so sized that its volume is about equal to the volume of one of the receptacles which are to be filled. Evidently then, assuming the cylinder to be full and the piston-head located at one end, the movement of the latter to the other end of the cylinder would, supposing the existence of a free passage from the cylinder, force out its entire contents, which will be just enough to fill one of the receptacles. However, since the cylinder may not be accurately proportioned and since it is advantageous to be able to fill receptacles of more than one size by the same apparatus the cylinder is provided with means for limiting the movement of the piston-head, so that its stroke shall not be the entire length of the cylinder, and consequently the discharge will be less than the total volume of the same. As a simple arrangement the heads or ends of the cylinder are provided, respectively, with adjusting-screws C, which fit transversely in said cylinder-heads and are arranged so that their inner ends project within the interior of the cylinder and their outer ends extend outwardly from the exterior surfaces of said cylinder-heads. In this way the entire length of stroke of the latter is regulated, and the volume ejected, being equal to the volume passed through by the piston-head, is correspondingly regulated. Consequently an adjustment of the screws C will proportion the amount of the discharge to any-sized receptacle within the limits of the machine.

The filler, in passing into the cylinder, moves the piston-head the length of its allotted stroke and the piston-head ejects, as it proceeds, the charge contained in the cylinder at that time. To this end it is necessary to provide suitable ports and valves, a convenient arrangement of which is shown in Figs. 3, 4, and 5. In these figures supply passages or ports D D' are shown leading from the inlet E, to which the supply-pipe F is connected, to each end of the cylinder, and the rotary or oscillating valve G is located at the junction of these passages with this inlet, so that the flow of filler may be shifted from one end of the cylinder to the other. Also leading from each end of the cylinder are the eduction passages or ports H H', provided with a similar valve L at their junction with the outlet J, so that a free passage may be opened from either end of the cylinder to this outlet J. To this outlet may be attached any suitable nozzle, as K, for directing the charge into the receptacle. (Shown in dotted lines, Fig. 3.) The mode of operation then, assuming that the screws C are adjusted so that the charge shall be of the proper amount, is that the filler flows into the cylinder through the port D, Fig. 5, until the piston-head has moved to the end of its stroke, as shown in Fig. 5, when the flow of filler necessarily stops. The valves G and L are then turned so that the supply of filler is directed into the cylinder through the port D', and the other side of the cylinder is opened to the outlet J through the port H. The piston-head B then moves toward the end A', forcing the charge out of the cylinder through the port H and outlet J into the receptacle while the cylinder is being filled through said port D'. A reversal of the valves directs the flow of filler again into the cylinder through port D, whereupon the contained charge is discharged into another receptacle, and so on.

In Fig. 4 the valves are shown in a middle position, in which case the apparatus is inoperative by reason of the supply-duct E being closed by the valve G.

As a simple and efficient means for operating the valves G and L, each is provided with an arm M, (shown best in Fig. 2,) which are pivotally connected by the link N. The rod O is connected at one end to the link N and at the other to the rocker-arm P by universal joints at O' and O², Fig. 1. This rocker-arm P is operated from the treadles Q Q' through the intervening rods R R' and levers S and S'. By this arrangement pressure on one treadle will throw the valves one way, thereby causing the cylinder A to be filled from one end, while its contained charge is ejected from the other, and pressure on the other treadle will throw the valves in the reverse direction with the opposite result. When the treadles are brought to a middle position, so that they would be together if arranged as in Fig. 1, the valves would be in the position shown in Fig. 4 and the supply of filler would be cut off from the apparatus.

It is found very desirable to keep account of the number of receptacles filled by the apparatus, and to such end the shaft T may be provided with an arm V, which operates any suitable registering device, as W, each time that a charge is ejected. In this way a record of the charges ejected is kept, and if the volume of each charge is known the total volume passed through the apparatus may be readily ascertained.

What I claim as my invention is—

1. An apparatus of the class specified comprising a cylinder provided with a couple of inlet-ports arranged between the ends of the cylinder and a single supply-opening and also with a couple of outlet-ports similarly arranged between the ends of the cylinder and a single exhaust-opening; a couple of connected plug-valves situated respectively at the junctions formed by the inlet-ports and the supply-opening, and by the outlet-ports and the exhaust-opening, and arranged to open the opposite ends of the cylinder to the supply and exhaust openings in alternation; means for operating said valves; a detached piston arranged within said chamber; and a nozzle communicating with the exhaust-opening and adapted to fit the mouth of the receptacle, as set forth.

2. An apparatus of the class specified comprising a cylinder provided with a couple of inlet-ports arranged between its ends and a single supply-opening, and provided also with a couple of outlet-ports also arranged between its ends and a single exhaust-opening; a couple of connected rotary valves situated respectively at the points of junction of the inlet-ports and the supply-opening, and of the outlet-ports and the exhaust-opening, and arranged to open the opposite end of the cylinder to the supply and exhaust openings in alternation; a couple of treadles for operating said valves; a detached piston arranged within said cylinder; adjusting-screws at the opposite ends of the cylinder for varying the length of stroke on the part of the piston; and a nozzle or the like communicating with the exhaust-opening and adapted to fit the mouth of a receptacle, substantially as described.

JOHN E. PARKER.

Witnesses:
A. F. DURAND,
A. MILLER BELFIELD.